Oct. 17, 1967 L. E. FREY 3,347,393

RECORD FILING MEANS

Filed Feb. 24, 1966

INVENTOR.
LOUIS E FREY

BY John H. Widdowson

ATTORNEY

United States Patent Office 3,347,393

Patented Oct. 17, 1967

3,347,393

RECORD FILING MEANS

Louis E. Frey, Wichita, Kans.
(10940 Bellagio Road, Los Angeles, Calif. 90024)

Filed Feb. 24, 1966, Ser. No. 529,739
4 Claims. (Cl. 211—40)

ABSTRACT OF THE DISCLOSURE

The invention is of a phonograph record holder, specially designed for the relatively small records having one musical performance or the like thereon, about 10 inches in diameter and which are turned at 45 revolutions per minute in playing same. The holder has a frame with a base and a pair of upwardly extending shafts. Horizontal support shafts are mounted between the upwardly extending shafts, and releasably mounted thereon. These structures are preferably made out of rods and/or wire. The usual record envelopes are punched and slidably mounted at the top and bottom to the rear on the horizontal support shafts. In order to hold the record envelopes closely together a member of bent wire or rod is frictionally mounted between the horizontal support shafts. Sliding this member along the shafts into engagement with the outside record envelope positions the envelopes and holds them in place.

This application is a continuation-in-part of applicant's Serial No. 393,243 filed Aug. 31, 1964, now Patent No. 3,258,126.

This invention relates to record storage and, more particularly, to a storage holder for the conventional disc type phonograph records, especially the 45 r.p.m. type which are relatively small in diameter. More specifically, this invention relates to a rack of rod construction adapted to releasably hold a plurality of phonograph records in record album jackets slidably mounted on the rack.

The acquisition of a number of phonograph records often presents the owner thereof with problems as to storage, indexing, etc. It is desirable that all of the records in a collection can be instantly available so that they can be played and enjoyed with a minimum of inconvenience. It is desirable also that the records be indexed so that any desired record can be quickly and easily located and removed, and later can be quickly returned to the proper indexed location after use. The record jacket or album could also be retained for easy future reference so that easy specific details as to the titles of the various selections vocalist, instrumentations, and history, can be determined if desired.

It is believed apparent that the usual record storage in a conventional cabinet, rack, or the like, however orderly and systematic of an arrangement, is not the ideal method of achieving the above-mentioned objectives. This is particularly true if there are a number of people using a common collection of records. The usual means of storing records known to the prior art is tedious and difficult to maintain in an orderly arrangement. Further, records not properly stored can become scratched and otherwise damaged which seriously detracts from their value and the future enjoyment derived therefrom. The various storage means for records known to the prior art do not provide a convenient method of indexing and storing records and safe guarding the same from damage. Furthermore, the known types of storage means often do not preserve the record jackets or albums in a substantially stationary position for future reference where they can be readily located. The known cabinets for storing records are very often expensive, take up excessive space in a room, and become out moded when the style of the rest of the furniture is changed so as to look out of place.

I have invented a new storage means for phonograph records and the like. In combination with the usual records, album jackets or envelopes therefor, the new storage means of my invention is used with a record having identifying indicia thereon and includes a record envelope or jacket having indicia corresponding to the indicia on the record, and a means to support the jacket in an upright position.

The record storage and holder and various combinations thereof of my invention solves most of the problems known to the storage means for records of the prior art. My new storage holder provides a very simple and dependable means for indexing records so they can be instantly located and removed from the record album jacket when desired. Furthermore, the holder or rack is so arranged and constructed that the record jacket of the storage and holder for any record can be conveniently located after the record has been used and is desired to again store it. The record jacket or albums are slidably mounted in the rack in an upright position, and the supporting arrangement is very efficient in requiring storage of the jackets and records to occupy only the actual thickness thereof. This allows many records to be stored in a relatively small space. The record storage of my new storage rack are protected from damage, scratching, etc., and are stored in a vertical position where they are unlikely to warp. Another advantage of my storage rack is that the invention is light in weight, attractive in appearance, and can be produced quite inexpensively.

It is a primary object of this invention to provide a new storage means for phonograph records utilizing a minimum of space for systematically storing records.

Another object of this invention is to provide a new phonograph record and storage album rack that holds the records in an upright position in jackets or enclosures supported by the rack in upright positions.

Still another object of my invention is to provide a new record storage means that is provided with an indexing means making possible the immediate location of any desired records supported therein.

A further object of my invention is to provide a record storage means which in use prevents damage, scratching, warping etc., of the records stored therein.

A still further object of my invention is to provide a record storage holder of light weight that is attractive in appearance, inexpensive to manufacture, and simple to use.

Further objects, features, and advantages of this invention will become apparent to those skilled in the art from the following description taken in connection with the accompanying drawings in which.

Figures 1, 2, 3, 4, 5:
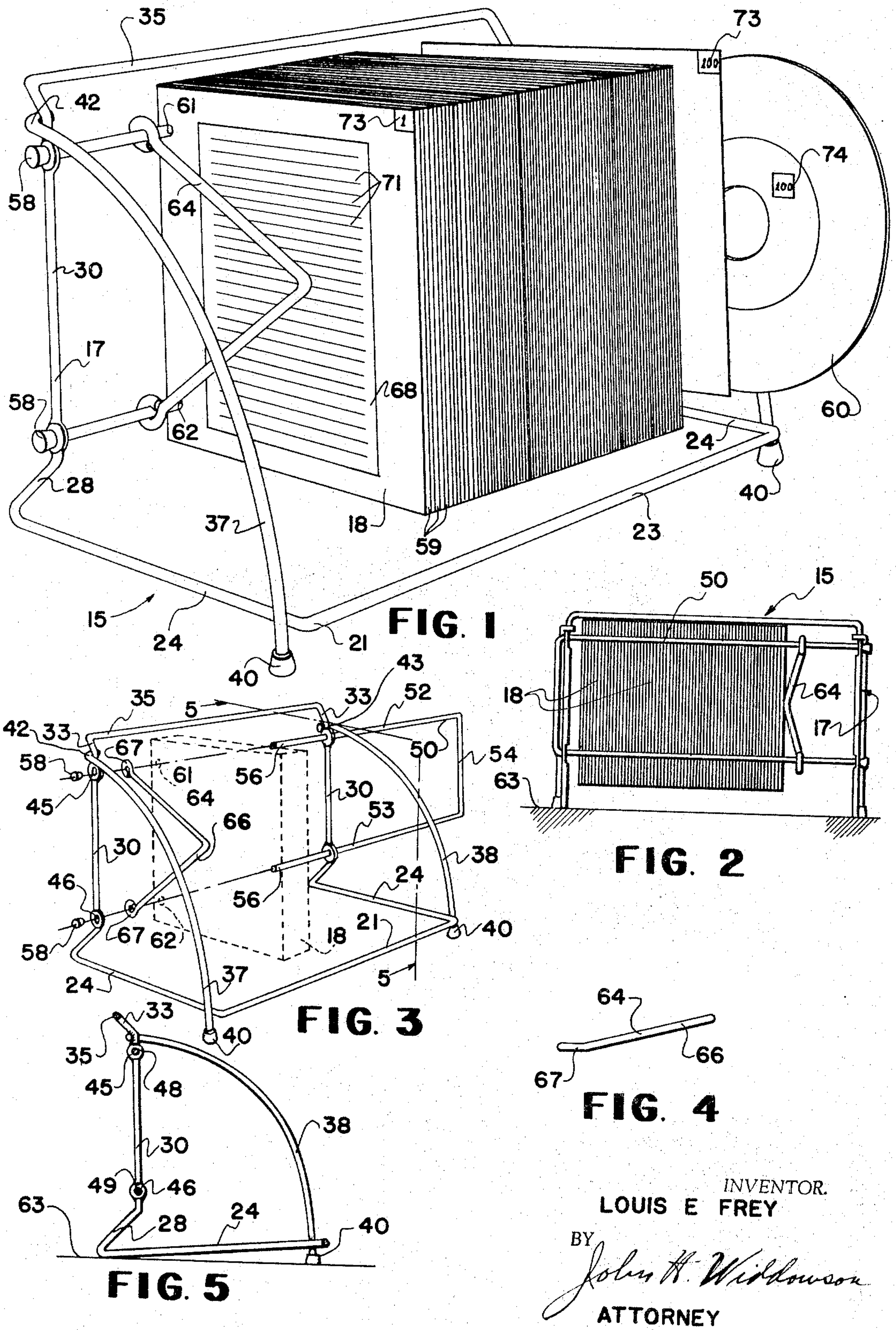
FIG. 1 is a perspective view of the record holder means of this invention.
FIG. 2 is a reduced rear elevational view of the record holder means of the invention.
FIG. 3 is an exploded perspective view of the basic frame assembly of the invention illustrating the method of assembly.
FIG. 4 is a top plan view of an abutment fixture of the invention.
FIG. 5 is a sectional view taken along line 5—5 in FIG. 3.

Referring now to the drawings, and particularly to FIG. 1, the record holder means of this invention is indicated generally at 15, and comprises a basic frame 17 releasably supporting a plurality of envelope-type record holders 18. The frame 17 is of a bent rod construction including a rearwardly and downwardly inclined base 21 comprising, a horizontal forward section 23 integral at opposite ends with side sections 24. As shown at FIG. 5, the rearward end of the side sections 24 are integral with reversibly inclined intermediate sections 28 secured to upright shaft members 30 extended substantially perpendicular to the side sections 24. The upper ends of the shaft members 30 are interconnected by upwardly and rearwardly inclined portions 33 joined by a top horizontal member 35.

Shown in FIG. 3 the forward portion of the base 21 is maintained in an elevated position by a pair of leg members 37 and 38 of arcuate shape respectively secured as by welding to the outer surfaces of the forward portion of the side sections 24. The lower forward ends of the leg members 37 and 38 are covered by resilient tips 40 used to protect the supporting surface from scratches and the like. The upper ends 42 and 43 of the leg members 37 and 38 respectively, are bent inwardly towards each other about the upper ends of the upright shaft members 30 and welded thereto. It is seen, therefore, that the leg members 37 and 38 perform the dual function of first holding the base 21 in a downward rearwardly inclined position and, secondly, interconnecting the base 21 and the upright shaft members 30 to prevent relative movement therebetween. The upright shaft members 30 have upper and lower flat portions 45 and 46, respectively, formed by stamping or hammering process. The flat portions 45 and 46 are formed with holes 48 and 49, respectively, with corresponding upper and lower pairs thereof in horizontal axial alignment.

A record support member 50 of U-shape has a pair of elongated leg sections 52 and 53 interconnected by base portion 54. The leg sections 52 and 53 are axially spaced a predetermined distance equal to that of the upper and lower holes 48 and 49 in the shaft member 30. The leg sections 52 and 53 of the support member 50 are movable within the holes 48 and 49, respectively, with the base section 54 positionable against the outer surface of one upright shaft member 30 and ends 56 of the leg sections 52 and 53 extended through and outwardly of the holes 48 and 49 of the opposite shaft member 30. As shown in FIGS. 1 and 3 a cap member 58 is releasably mounted about the ends 56 of the leg sections 52 and 53 to prevent unintentional axial movement of the support member 50. It is seen therefore, that the leg sections 52 and 53 are maintained in a spaced relation and vertically supported by the shaft support members 30.

As shown at FIG. 1, the record holders 18 resemble conventional album jackets or enclosure envelopes of a relatively strong material having open ends 59 adapted to receive records 60 herein illustrated of the smaller or 45 r.p.m. size. The rearward ends of the record holders 18 opposite the open ends 59 are provided in spaced holes 61 and 62. The spacing of these holes in the record holders 18 are substantially identical as the axial spacings of the leg sections 52 and 53 of the support member 50 for reasons to become obvious.

In the use of the record holder means 15, the structure is set upright on a supporting surface 63 with the frame 17 having the forward end resting on the protective tips 40 and the rearward end supported on the side sections 24. The leg sections 52 and 53 of the removable support member 50 extends through the holes 48 and 49, respectively of the upright shaft members 30, and intermediate thereof, through the holes 61 and 62 in a plurality of the record holders 18. The cap members 58 about the ends 56 of the leg sections 52 and 53 prevent movement of the support member 50 in one direction transversely of the holes 48 and 49 and movement in the opposite direction is prevented by the abutment of the base section 54 and one of the shaft members 30. It is seen that the record holders 18 are held in an inclined position on the support member 50 with the open ends 59 thereof upper furthermost so that records 60 contained therein have a tendency to roll rearwardly away from the open ends 59. Furthermore, the record holders 18 are movable laterally on the leg sections 52 and 53 for ease of removal and replacement of the records 60.

As shown in FIGS. 1 and 2, a movable abutment fitting 64 may be mounted about the leg sections 52 and 53 of the support member 50 to releasably hold the record holders 18 in a compact condition. The abutment fitting 64 is a rod material having a main body 66 of right angular shape. Opposite ends of the body 66 are bent into circular loops 67 inclined in the same direction relative to the body 66. The loops 67 have an inner diameter slightly greater than the diameter of the leg sections 52 and 53 of the support member 50.

In use of the abutment fixture 64, the loops 67 are mounted about the leg sections 52 and 53 adjacent one end of the record holders 18 so that the main body 66 is inclined therefrom toward the record holders 18. Abutting fixture 64 is axially movable on the leg sections 52 and 53 into engagement with the record holders 18 whereby the counter reactive force against the body 66 results in a rotational movement with binding action of the loops 67 on the leg sections 52 and 53. As seen, therefore, the abutment fitting 64 maintains the record holders 18 in a compacted condition to take up space between the record holders 18 so as to present a neat and attractive appearance.

Additionally, it is obvious that the conventional decorative album jackets normally provided with the records 60 could be used instead of the record holders 18. The album jackets need only to be provided with spaced punched holes for mounting on the leg sections 52 and 53 of the support member 50. The record holders 18 can then be easily replaced by the album jackets on removing cap members 58 from the ends 56 and moving the support member 50 inwardly of one of the upright shaft members 30. It is seen that the abutment fixtures 64 and the record holders 18 can then be removed with the record holders being replaced by the decorative album jackets and the record holder means reassembled as previously explained.

The record storage album rack of my invention is preferably provided with an indexing means to facilitate the location and orderly storage of the records contained therein. The indexing means includes a rectangular sheet 68, preferably a cardboard sheet having a gummed back surface adapted for adhesion to an end one of the record holders 18 (FIG. 1). The front surface of the sheet 68 has indicia 71, or other consecutive indicia thereon. At least two identical sets of gummed labels having numbers, or other indicia, printed thereon are provided. In use, one set of numeral labels are secured to the upper corner of the record holders 18 or album jackets as indicated by numeral 73 as shown in FIG. 1. The other set of gummed labels is adhered to the records 60 as indicated by numeral 74 in FIG. 1. Another suitable indexing system for use with my invention is to provide a sheet, book, etc., wherein the record titles are listed alphabetically and the numbers assigned to each album is indicated after each title. The numbers associated with the record titles can be a third set of indicia labels if desired.

As will be appreciated to persons skilled in the art, the record holder means 15 including basic frame 17 with the leg members 37 and 38 and the support member 50 may be formed from a rod material of common diameter. The record holder means 15 can therefore be produced relatively inexpensively. However, it is understood that the rack can be made of any suitable material, such as wood, plastic, fibrous material, or combinations thereof. The entire assembly including the holder means 15, the record holders 18, and album jackets, with records 60 presents a very neat appearance and is relatively light in weight. The rack furthermore prevents the records properly contained therein from becoming scratched and otherwise damaged.

As will be obvious to those skilled in the art, various changes and modifications of the preferred record storage holder means of my invention and elements thereof, as described herein can be made or followed without departing from the spirit of the disclosure or the scope of the claims.

I claim:

1. A record holder means for storage of records comprising:
(a) a frame member having a base section integral with a pair of upwardly extending shaft sections,
(b) horizontal support means releasably connected to and extending between said shaft sections,
(c) a plurality of record holders slidably connected to said horizontal support means and movable substantially the entire length thereof, and said holders adapted to support records therein, and
(d) abutment means slidably mounted on said support means and movable into binding engagement with said record holders.

2. A record and enclosure means holder comprising:
(a) base means having spaced upright shaft members,
(b) a plurality of vertically spaced horizontally extended support members connected to and extended between said shaft members,
(c) means for releasably connecting said support members to said shaft members, and
(d) a plurality of holder means slidably connected to said horizontal support members whereby said holder means are movable substantially the entire length of said support members and maintained in an upright position, said holder means adapted to support records therein.

3. A record and enclosure means holder as described in claim 4, in which:
(a) said support members interconnected by a base section so as to be of a U-shape,
(b) said connecting means having a pair of spaced openings in each of said shaft members whereby support members are slidably mounted within said openings, and
(c) said support members selectively movable outwardly of one pair of said openings whereby said holder means may be removed and replaced on said support members.

4. A record and enclosure means holder as described in claim 4, including:
(a) index means including a consecutive set of numerical indicia individually secured to said holder means, and a corresponding second consecutive set of numerical indicia individually secured to the records whereby the original and predetermined location of each record can be readily located for an efficient means of record indexing.

References Cited

UNITED STATES PATENTS

| | | | |
|---|---|---|---|
| 3,144,943 | 8/1964 | Punt | 211—40 |
| 3,176,848 | 4/1965 | Stefan | 211—40 |

FOREIGN PATENTS

| | | |
|---|---|---|
| 80,036 | 10/1955 | Denmark. |

ROY D. FRAZIER, *Primary Examiner.*

J. F. FOSS, *Examiner.*